United States Patent [19]
Puyenbroek et al.

[11] Patent Number: 6,001,957
[45] Date of Patent: Dec. 14, 1999

[54] STABILIZED POLYETHERIMIDE RESIN COMPOSITION

[75] Inventors: Robert Puyenbroek, Bergen op Zoom, Netherlands; Darryl Nazareth, Flanders, N.J.; Robert Hayes, Wadesville; Yimin Jin, Newburgh, both of Ind.

[73] Assignee: General Electric Company, Pittsfield, Mass.

[21] Appl. No.: 08/997,200

[22] Filed: Dec. 23, 1997

[51] Int. Cl.$^6$ .............................. C08L 77/00; C08G 69/00
[52] U.S. Cl. .................... 528/332; 528/170; 528/310; 528/312; 528/313; 528/321; 528/322; 528/336; 528/337; 525/289; 525/432; 525/436; 525/537; 524/600; 524/606
[58] Field of Search ..................... 525/436, 537, 525/289, 432; 524/600, 606; 528/170, 322, 310, 332

[56] References Cited

U.S. PATENT DOCUMENTS

| | | |
|---|---|---|
| 3,803,085 | 4/1974 | Takehoshi et al. ................. 528/170 |
| 3,814,869 | 6/1974 | De Luca ........................ 179/175.1 R |
| 3,847,867 | 11/1974 | Heath et al. ...................... 525/170 |
| 3,850,885 | 11/1974 | Takekoshi et al. ................. 528/170 |
| 3,852,242 | 12/1974 | White ............................ 528/170 |
| 3,855,178 | 12/1974 | White et al. ..................... 528/170 |
| 3,905,942 | 9/1975 | Takekoshi et al. ................. 528/170 |
| 3,972,902 | 8/1976 | Heath et al. ..................... 549/241 |
| 3,983,093 | 9/1976 | Williams, III et al. ............. 528/170 |
| 4,455,410 | 6/1984 | Giles, Jr. ....................... 525/436 |
| 4,929,665 | 5/1990 | Inoue et al. ..................... 524/500 |
| 5,674,947 | 10/1997 | Oishi et al. ..................... 525/289 |

Primary Examiner—P. Hampton-Hightower

[57] ABSTRACT

A thermoplastic resin composition that includes a polyetherimide resin and a phosphorus-containing stabilizer that exhibits a low volatility. The thermoplastic resin composition exhibits improved melt stability and improved resistance to thermal degradation.

12 Claims, No Drawings

STABILIZED POLYETHERIMIDE RESIN COMPOSITION

FIELD OF THE INVENTION

The present invention relates to stabilized polyetherimide resin compositions.

BACKGROUND

Polyetherimide resins are high temperature engineering plastics that exhibit good thermal stability and typically do not require stabilizing additives. However, under certain extreme conditions, such as, for example, when molding unusually large parts or when operating at the upper extreme of the recommended molding temperature or residence time, undesirable changes in the polyetherimide resin, such as, for example, increased viscosity, increased yellowness and contamination of the polyetherimide resin with "black specks", may occur. The black speck contamination is thought to be the result of localized thermal degradation and carbonization of the polyetherimide resin due to overheating.

A polyetherimide resin that exhibits improved melt stability and resistant to degradation under extreme processing conditions is desired.

SUMMARY OF THE INVENTION

The present invention is directed to a thermoplastic resin composition, comprising:

(a) a polyetherimide resin, and
(b) a phosphorus-containing stabilizer, in an amount that is effective to increase the melt stability of the polyetherimide resin, wherein the phosphorus-containing stabilizer exhibits a low volatility such that, as measured by thermogravimetric analysis of an initial amount of a sample of the phosphorus-containing stabilizer, greater than or equal to 10 percent by weight of the initial amount of the sample remains unevaporated upon heating of the sample from room temperature to 300° C. at a heating rate of a 20° C. per minute under an inert atmosphere.

The composition of the present invention exhibits improved melt stability and improved resistance to thermal degradation.

DETAILED DESCRIPTION OF THE INVENTION

In a preferred embodiment, the thermoplastic resin composition of the present invention comprises from 0.01 to 0.5 parts by weight ("pbw"), more preferably from 0.02 to 0.2 pbw and even more preferably from 0.05 to 0.15 pbw, of the phosphorus-containing stabilizer per 100 pbw of the thermoplastic resin.

In a preferred embodiment, the thermoplastic resin composition consists essentially of the polyetherimide resin and the phosphorus-containing stabilizer.

In an alternative preferred embodiment, the thermoplastic resin composition comprises the above disclosed polyetherimide resin and phosphorus-containing stabilizer and further comprises a second thermoplastic resin.

In a more highly preferred embodiment, the thermoplastic resin composition comprises from 30 to 99 pbw of the polyetherimide resin, from 1 to 70 pbw of the second thermoplastic resin and from 0.01 to 0.5 pbw, more preferably from 0.02 to 0.2 pbw and even more preferably from 0.05 to 0.15 pbw, of the phosphorus-containing stabilizer, each based on 100 pbw of the combined polyetherimide resin and second thermoplastic resin.

Thermoplastic resins suitable as the second thermoplastic resin of the preferred embodiment of the present invention include, for example, polyester resins, polyamide resins, aromatic polycarbonate resins, polysulfone resins, poly(phenylene sulfide) resins, poly(phenylene ether) resins, each of which are known compounds that are made by known methods and are commercially available.

As used herein, the terminology "melt stability" means the tendency of the polyetherimide component of the thermoplastic resin composition not to undergo changes in chemical composition or molecular weight when in a molten state. The chemical composition and molecular weight of a polyetherimide resin having ideal melt stability would remain unchanged when the resin composition is in the molten state, while the chemical composition and molecular weight of a polyetherimide resin having poor melt stability would change markedly when the resin is in the molten state.

The polyetherimide resins of the composition of the present invention are known compounds whose preparation and properties are described in U.S. Pat. Nos. 3,803,085 and 3,905,942, each of which is incorporated herein by reference.

In a preferred embodiment, the polyetherimide resin component of the present invention contains from greater than 1 to 1000 or more, preferably from 10 to 1000, structural units of the formula (I):

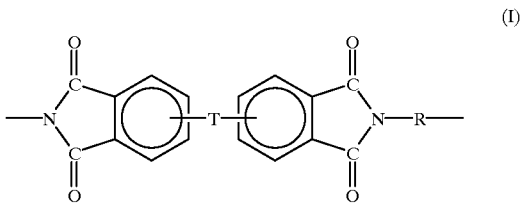

wherein the divalent T moiety bridges the 3,3', 3,4', 4,3', or 4,4' positions of the aryl rings of the respective aryl imide moieties of formula (I); T is —O— or a group of the formula —O—Z—O—; Z is a divalent radical selected from the group consisting of formulae (II):

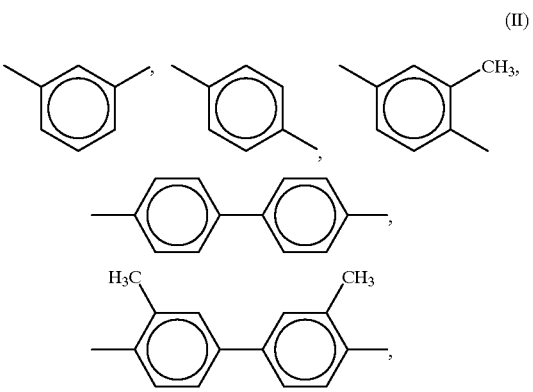

-continued

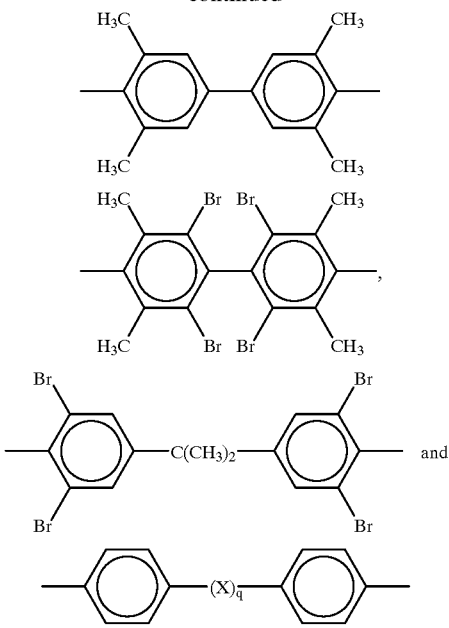

wherein X is a member selected from the group consisting of divalent radicals of the formulae (III):

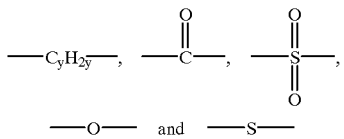
(III)

wherein y is an integer from 1 to about 5, and q is 0 or 1; R is a divalent organic radical selected from the group consisting of: (a) aromatic hydrocarbon radicals having from 6 to about 20 carbon atoms and halogenated derivatives thereof, (b) alkylene radicals having from 2 to about 20 carbon atoms, (c) cycloalkylene radicals having from 3 to about 20 carbon atoms, and (d) divalent radicals of the general formula (IV):

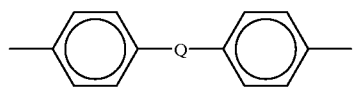
(IV)

where Q is a member selected from the group consisting of formulae (V):

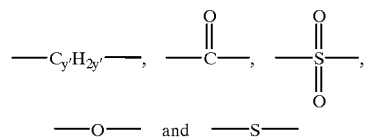
(V)

where y' is an integer from about 1 to about 5.

In one embodiment, the polyethermide resin may be a copolymer which, in addition to the etherimide units described above, further contains polyimide repeating units of the formula (VI):

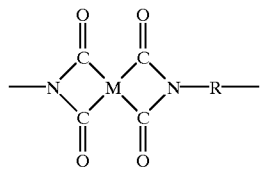
(VI)

wherein R is as previously defined for formula (I) and M is selected from the group consisting of formula (VII):

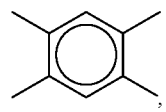
(VII)

formula (VIII):

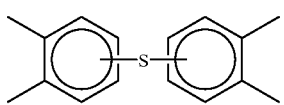
(VIII)

and formula (IX):

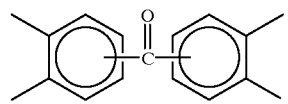
(IX)

Polyetherimide resins are made by known methods, such as, for example, those disclosed in U.S. Pat. Nos. 3,847,867, 3,814,869, 3,850,885, 3,852,242, 3,855,178 and 3,983,093, the disclosures of which are hereby incorporated herein by reference.

In a preferred embodiment, the polyetherimide resin is made by the reaction of an aromatic bis(ether anhydride) of the formula (X):

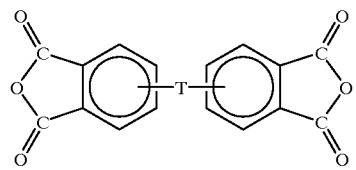
(X)

with an organic diamine of the formula (XI):

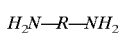
$H_2N-R-NH_2$ (XI)

wherein T and R are defined as described above in formula (I). In general the reactions can be carried out employing well-known solvents, for example, o-dichlorobenzene, m-cresol/toluene and the like to effect interaction between the anhydride of formula (X) and the diamine of formula (XI), at temperatures from about 100° C. to about 250° C. Alternatively, the polyethermide resin can be prepared by melt polymerization of aromatic bis(ether anhydride)s and diamines accomplished by heating a mixture of the ingredients at elevated temperatures with concurrent stirring. Generally melt polymerizations employ temperatures between about 200° C. and 400° C. Chain stoppers and branching agents may also be employed in the reaction.

Examples of specific aromatic bis(ether anhydrides) and organic diamines are disclosed, for example, in U.S. Pat. Nos. 3,972,902 and 4,455,410, which are incorporated by reference herein.

Illustrative examples of aromatic bis(ether anhydride)s of formula (X) include: 2,2-bis(4-(3,4-dicarboxyphenoxy) phenyl)propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3, 4-dicarboxyphenoxy)benzophenone dianhydride; 4,4'-bis(3, 4-dicarboxyphenoxy)diphenyl sulfone dianhydride; 2,2-bis ([4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-3,4-dicarboxyphenoxy)diphenyl-2,2-propane dianhydride; 4-(2, 3-dicarboxyphenoxy)-4'-(3,4-dicarboxyphenoxy)diphenyl ether dianhydride; 4-(2,3-dicarboxyphenoxy)4'-(3,4-dicarboxyphenoxy)diphenyl sulfide dianhydride; 4-(2,3-dicarboxyphenoxy)-4'-(3,4-dicarboxyphenoxy) benzophenone dianhydride and 4-(2,3-dicarboxyphenoxy) 4'-(3,4-dicarboxyphenoxy)diphenyl sulfone dianhydride, as well as various mixtures thereof.

A preferred class of aromatic bis(ether anhydride)s included by formula (X) above includes compounds wherein T is of the formula (XII):

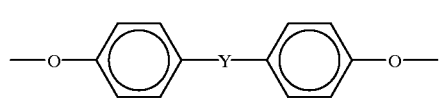

(XII)

wherein each Y is independently selected from the group consisting of: formulae (XIII):

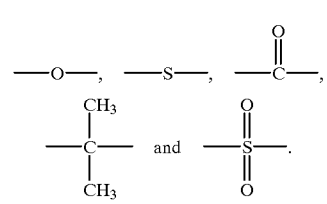

(XIII)

When polyetherimide/polyimide copolymers are employed, a dianhydride, such as pyromellitic anhydride, is used in combination with the bis(ether anhydride).

The bis(ether anhydride)s can be prepared by the hydrolysis, followed by dehydration, of the reaction product of a nitro substituted phenyl dinitrile with a metal salt of dihydric phenol compound in the presence of a dipolar, aprotic solvent.

Suitable organic diamines of formula (XI) include, for example: m-phenylenediamine; p-phenylenediamine; 4,4'-diaminodiphenylpropane, 4,4'-diaminodiphenylmethane (commonly named 4,4'-methylenedianiline); 4,4'-diaminodiphenyl sulfide; 4,4'-diaminodiphenyl sulfone; 4,4'-diaminodiphenyl ether (commonly named 4,4'-oxydianiline); 1,5-diaminonaphthalene; 3,3-dimethylbenzidine; 3,3-dimethoxybenzidine; 2,4-bis(beta-amino-t-butyl)toluene; bis(p-beta-amino-t-butylphenyl) ether; bis(p-beta-methyl-o-aminophenyl)benzene; 1,3-diamino-4-isopropylbenzene; 1,2-bis(3-aminopropoxy) ethane; benzidine; m-xylylenediamine; 2,4-diaminotoluene; 2,6-diaminotoluene; bis(4-aminocyclohexyl)methane; 3-methylheptamethylenediamine; 4,4-dimethylheptamethylenediamine; 2,11-dodecanediamine; 2,2-dimethylpropylenediamine; 1,18-octamethylenediamine; 3-methoxyhexamethylenediamine; 2,5-dimethylhexamethylenediamine; 2,5-dimethylheptamethylenediamine; 3-methylheptamethylenediamine; 5-methylnonamethylenediamine; 1-4 cyclohexanediamine; 1,18-octadecanediamine; bis(3-aminopropyl)sulfide; N-methyl-bis(3-aminopropyl)amine; hexamethylenediamine; heptamethylenediamine; nonamethylenediamine; decamethylenediamine and mixtures of such diamines.

Illustrative of a particularly preferred polyethermide resin falling within the scope of formula (I) is one comprising repeating units wherein R is paraphenylene, metaphenylene, or mixtures of paraphenylene and metaphenylene and T is a group of the formula -O-Z-O- wherein Z has the formula (XIV):

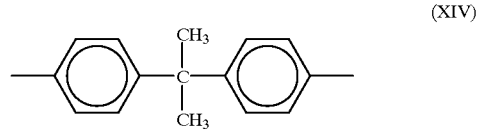

(XIV)

and wherein the divalent group (XIV) bridges the 3,3' positions of the aryl rings of the respective aryl imide moieties of formula (I).

In a preferred embodiment, the polyetherimide resin of the present invention resin has a weight average molecular weight of from about 10,000 to about 150,000 grams per mole ("g/mol"), as measured by gel permeation chromatography, using a polystyrene standard. Such polyetherimide resins typically have an intrinsic viscosity [η37] greater than about 0.2 deciliters per gram, preferably of from about 0.35 to about 0.7 deciliters per gram measured in m-cresol at 25° C. and exhibit a melt index of from about 0.1 to about 10, measured according to ASTM D1238 at 337° C. using a 6.6 kilogram weight.

Phosphorus-containing stabilizer compounds suitable for use as the phosphorus-containing stabilizer component of the present invention are those that exhibit a low volatility. The volatility of a phosphorus-containing stabilizer may be measured by thermogravimetric analysis, that is, by heating a sample of the stabilizer and monitoring the relative amount of a sample of the stabilizer that remains non-evaporated as the temperature of the sample is increased. In a preferred embodiment, greater than or equal to 10 percent by weight ("wt %"), more preferably greater than or equal to 30 wt %, even more preferably greater than or equal to 50 wt %, and still more preferably greater than or equal to 70 wt %, of the initial amount of a sample of phosphorus-containing stabilizer remains upon heating of the sample from room temperature to 300° C. at a heating rate of a 20° C. per minute under an inert atmosphere, such as, for example, nitrogen.

In a preferred embodiment, the phosphorus-containing compound is a compound according to the structural formula (XV):

$P-R'_a$ (XV)

wherein:
each R' is independently H, alkyl, alkoxyl, aryl, aryloxy or oxo, and a is 3 or 4.

As used herein, "alkyl" means a straight or branched chain alkyl group, preferably a $(C_1-C18)$alkyl group, wherein the notation $(C_n-C_m)$ means a group containing from n to m carbon atoms per group and includes, for example methyl, ethyl n-butyl, isobutyl, tert-butyl, octyl, decyl, stearyl.

As used herein, "alkoxyl" means a straight or branched alkoxyl group, preferably a $(C_1-C_{18})$alkoxyl group, and includes, for example, methoxyl, ethoxyl, butoxyl, nonyloxyl.

As used herein, "aryl" means a radical containing an unsaturated ring of six carbon atoms, which may optionally be substituted with one or more alkyl groups, and includes, for example, phenyl, tolyl, xylyl.

As used herein, "aryloxy" means an oxygen radical that is substituted with an unsaturated ring of six carbon atoms, which itself may optionally be substituted with one or more alkyl groups, and includes, for example, phenoxy.

As used herein, "oxo" means a divalent oxygen radical.

In a more highly preferred embodiment, the phosphorus-containing stabilizer is selected from the group consisting of the reaction product of phosphorus trichloride with 1,1-biphenyl and 2,4-t-butylphenol, 2-[[2,4,8,10 tetrakis(1,1-dimethylethyl) dibenzo [d,fl[1,2,3]dioxaphosphenin-6-ylloxy]-N,N-bis[2-[[2,4,8,10-tetrakis(1,1-dimethylethyl) dibenzo [d,f][1,2,3] dioxphosphepin-6-yl]oxyl-ethyllethanamine, sodium phenyl phosphonate and 2,4di-tert-butylphenol phosphite and mixtures thereof. Most preferably, the phosphorus-containing stabilizer comprises 2,4-di-tert-butylphenol phosphite.

In a preferred embodiment, the composition of the present invention further comprises a sterically hindered phenolic stabilizer.

Suitable phenolic stabilizers include, for example, alkylated monophenols, polyphenols and alkylated reaction products of polyphenols with dienes, such as, for example, N,N'-16-hexanedyl bis[3,5-bis(1,1-dimethylethyl)-4-hydroxybenzenepropanamidel, tetra-cis(methylene)-3,5-di-t-butyl-4-hydroxycinnamate, butylated reaction products of para-cresol and dicyclopentadiene, alkylated hydroquinones, hydroxylated thiodiphenyl ethers, alkylidene-bisphenols, benzyl compounds, acylaminophenols, esters of beta-(3,5-di-tert-butyl4-hydroxyphenol)-propionic acid with monohydric or polyhydric alcohols, esters of beta-(5-tert-butyl-4-hydroxy-3-methylphenyl)-propionic acid with monohydric or polyhydric alcohols, esters of beta-(5-tert-butyl-4-hydroxy-3-methylphenyl)-propionic acid with mono-or polyhydric alcohols.

In a preferred embodiment, the thermoplastic resin composition of the present invention contains a phenolic stabilizer selected from N,N'-16-hexanedyl bis[3,5-bis(1,1-dimethylethyl)-4hydroxybenzenepropanamide], the butylated reaction product of p-cresol and dicylopentadiene, terakis(methylene(3,5-di-t-butyl4-hydroxyhydrocinnamate) and mixtures thereof, and most preferably, comprises tetrakis(methylene(3,5-di-t-butyl4-hydroxyhydrocinnamate).

In a preferred embodiment, the thermoplastic resin composition of the present invention further comprises from 0.01 to 0.5 pbw, more preferably from 0.02 to 0.2 pbw, even more preferably from 0.05 to 0.15 pbw, of the phenolic antioxidant per 100 parts by weight of the thermoplastic resin composition.

In a preferred embodiment, the composition of the present invention further comprises a mold release agent. Suitable mold release agents are know in the art and include, for example, pentaerythritol tetrastearate, polyethylene resins or waxes, and p-tallow toluene sulfonamide.

In a preferred embodiment, the composition of the present invention contains from 0.1 pbw to 2.0 pbw of the mold release agent per 100 parts by weight of the thermoplastic resin composition.

In a highly preferred embodiment, the mold release agent is p-tallow toluene sulfonamide. Use of p-tallow toluene sulfonamide maintains the transparency of the polyetherimide composition of the present invention.

Other Additives

The thermoplastic resin composition of the present invention may optionally also contain various conventional additives, such as fillers and reinforcing agents, such as, for example, silicates, $TiO_2$, glass fibers, carbon black, graphite, calcium carbonate, talc, mica and other additives such as, for example, UV absorbers, light stabilizers, lubricants, plasticizers, pigments, dyes, colorants, anti-static agents, blowing agents, as well as other antioxidants and stabilizers in addition to the above-disclosed phosphorus-containing and phenolic stabilizers.

The preparation of the compositions of the present invention is normally achieved by combining and mixing the components of the composition under conditions suitable for the formation of a blend of the components. Suitable conditions include solution blending or melt mixing in single or twin screw type extruders, mixing bowl, or similar mixing devices which can apply a shear to the components. Twin screw extruders are often preferred due to their more intensive mixing capability over single screw extruders. It is often advantageous to apply a vacuum to the melt through at least one vent port in the extruder to remove volatile impurities in the composition.

The composition of the present invention can be molded into useful shaped articles, such as, for example, heat resistant containers, by a variety of known means such as, for example, injection molding and extrusion.

Examples 1–7 and Comparative Examples C1–C5

The thermoplastic resin compositions Examples 1–7 of the present invention and of Comparative Examples C1–C5 were made by combining the components described below in the relative amounts (each expressed in percent by weight, based on the total weight of the respective thermoplastic resin composition) set forth in TABLES I and II. The components used in the thermoplastic resin compositions were as follows:

| | |
|---|---|
| PEI-1 | Polyetherimide resin made by condensation of 2,2-bis[4-(3,4-dicarboxyphenoxy)phenyl]propane dianhydride with paraphenylene diamine and having a melt index of 0.4 grams per minute at 337° C. using a 6.6 kilogram weight, |
| PEI-2 | Polyetherimide resin made by condensation of a 2,2-bis[4-(3,4-dicarboxyphenoxy)phenyl]propane dianhydride with metaphenylene diamine and having a melt index of 0.9 grams per minute at 337° C. using a 6.6 kilogram weight, |
| PHOS-1 | 2,4-di-tert-(butylphenyl)phosphite(Irgafos ™ 168,Ciba-Geigy) |
| PHOS-2 | Bis(2,4-di-ter-butyl)pentaerythritol diphosphate (Ultranox ™ 626, GE Specialty Chemicals, Inc.), |
| PHOS-3 | Reaction product of phosphorus trichloride with 1,1-biphenyl and 2,4-t-butylphenol(PEPQ, Sandoz), |
| PHOS-4 | 2-[[2,4,8,10 tetrakis(1,1-dimethylethyl)dibenzo [d,f][1,2,3]dioxaphosphenin-6-yl]-N,N-bis[2- |

-continued

|  | |
|---|---|
| | []2,4,8,10-tetrakis(1,1-dimethylethyl)dibenzo [d,f][1,2,3]dioxphosphepin-6-yl]oxy]-ethyl]ethanamine(Irgafos ™ 12, Ciba-Geigy), |
| PHOS-5 | Diphenylphosphite (GE Specialty Chemicals, Inc.) |
| PHOS-6 | Tris(nonylphenyl)phosphite (GE Specialty Chemicals, Inc.) |
| PHEN | Terakis(methylene(3,5-di-t-butyl-4-hydroxyhydrocinnamate)(Irganox ™ 1010, Ciba-Geigy), and |
| MR | Mold release, p-tallow toluenesulfonamide (Uniplex ™ 413, Unitex Chemical Co.). |

TABLE I

| | Ex# 1 | Ex# 2 | Ex# 3 | CEx# C1 | CEx# C2 | CEx# C3 | CEx# C4 |
|---|---|---|---|---|---|---|---|
| PEI-1 | 99.85 | 99.7 | 99.7 | 100 | 99.85 | 99.85 | 99.7 |
| PHOS-1 | 0.15 | 0.15 | 0.3 | — | — | — | — |
| PHOS-5 | — | — | — | — | 0.15 | — | — |
| PHOS-6 | — | — | — | — | — | 0.15 | — |
| PHEN | — | — | — | — | — | — | 0.3 |
| MR | — | 0.15 | — | — | — | — | — |

TABLE II

| | CEx# C5 | Ex# 4 | Ex# 5 | Ex# 6 | Ex# 7 |
|---|---|---|---|---|---|
| PEI-2 | 100 | 99.8 | 99.9 | 99.9 | 99.9 |
| PHEN | — | 0.1 | — | — | — |
| PHOS-1 | — | 0.1 | — | — | — |
| PHOS-2 | — | — | — | 0.1 | — |
| PHOS-3 | — | — | — | — | 0.1 |
| PHOS-4 | — | — | 0.1 | — | — |

Samples of PHOS-1, PHOS-2, PHOS-3 and PHOS4 were subjected to thermogravimetric analysis wherein the samples were each heated from 40° C. to 900° C. at a heating rate of 20° C. per minute in a nitrogen atmosphere, using a Perkin-Elmer Model TGA7. Results of the thermogravimetric analysis are set forth below in TABLE III as the amount of non-evaporated sample remaining upon heating to 300° C., expressed as a percentage of the initial amount of sample ("%"). PHOS 5 and PHOS 6 are liquids at room temperature with boiling point less than 300° C. and were not subjected to thermogravimetric analysis.

TABLE III

| Phosphorus-Containing Stabilizer | Relative Amount Remaining at 300° C. (%) |
|---|---|
| PHOS-1 | 62 |
| PHOS-2 | 33 |
| PHOS-3 | 72 |
| PHOS-4 | 99 |

Samples of the compositions of Comparative Example C1 and Examples 1 and 2 were maintained at 385° C. and the weight average molecular weight ($M_w$") and number average molecular weight ("Mn") of each of the samples was monitored by gel permeation chromatography ("GPC"). The polydispersity ("PD") was calculated for each set of measurements as the quotient $M_w/M_n$.

The molecular weights are set forth below in TABLE IV with increasing residence time at 385° C. as $M_w$ and $M_n$, each expressed in grams per mole, and PD, for the compositions of Comparative Example C1 and Examples 1 and 2.

TABLE IV

| Residence Time (min) | CEx# C1 Molecular Weight ($M_w/M_n$/PD) | Ex# 1 Molecular Weight ($M_w/M_n$/PD) | Ex# 2 Molecular Weight ($M_w/M_n$/PD) |
|---|---|---|---|
| 0 | 53000/21000/2.5 | 53000/21000/2.6 | 61000/26000/2.4 |
| 10 | 58000/23000/2.5 | 59000/23000/2.5 | 63000/26000/2.4 |
| 15 | 61000/24000/2.5 | 59000/24000/2.5 | 63000/26000/2.5 |
| 45 | 75000/24000/3.1 | 60000/24000/2.5 | 67000/26000/2.6 |
| 75 | 94000/23000/4.1 | 85000/23000/3.8 | 72000/24000/3.0 |
| 90 | 94000/22000/4.3 | 94000/21000/4.5 | 75000/26000/2.9 |

The Composition of Comparative Example C1 exhibited a more rapid increase in molecular weight, as compared to the compositions of Examples 1 and 2.

The relative amount of amine end-groups of each of the samples was also monitored, using Fourier transfer infrared spectroscopy ("FTIR"). The amine end-group content of the compositions of Examples 1 and 2 and Comparative Example C1 is set forth below in TABLE V with increasing residence time at 385° C. as the relative amount of amine end-groups, expressed as mole %.

TABLE V

| Residence Time (min) | CEx# C1 Amine end-groups (mole %) | Ex# 1 Amine end-groups (mole %) | Ex# 2 Amine end-groups (mole %) |
|---|---|---|---|
| 0 | 0.07 | 0.06 | 0.14 |
| 15 | 0.36 | 0.04 | 0.20 |
| 75 | 0.64 | 0.07 | 0.12 |

The composition of Comparative Example C1 exhibited a dramatic increase in the relative amount of amine end-groups, compared to the compositions of Examples 1 and 2.

The compositions of Example 1 and 2 each exhibited improved stability relative to the composition of Comparative Example C1, with respect to both molecular weight and end-group composition.

The weight average molecular weight ($M_w$) of samples of the composition of Example 4 and the composition of Comparative Example C5 were measured GPC before and after injection molding using a front/middle/rear temperature profile of 690° F./670° F./650° F. and a mold temperature of 300° F. The molecular weight measurements before and after molding, the change in molecular weight during molding ("ΔMw"), each expressed in grams per mole ("g/mole") and percent change in molecular weight ("%$\Delta M_w$") during molding are each set forth below in TABLE VI for each of the compositions.

TABLE VI

| | Ex# 4 | CEx# C5 |
|---|---|---|
| $M_w$ before molding, (g/mole) | 55124 | 58845 |
| $M_w$ after molding (g/mole) | 54818 | 57535 |
| Δ $M_2$ (g/mole) | 306 | 1310 |
| %Δ $M_w$ | 0.56 | 2.23 |

The composition of Example 4 exhibited improved short term melt stability, as indicated by the less pronounced shift in molecular weight during molding that was exhibited by the composition of Example 4, compared to that of Comparative Example 5. Parts molded from the composition of Example 4 exhibited reduced black speck contamination, as determined by visual inspection, compared to parts molded from the composition of Example C5.

Molten samples of the compositions of Examples 1 and 3 and Comparative Examples C1-C4 were maintained at 385° C. in a rotary viscometer (Haake System 90). The torque required to maintain the rotor of the viscometer rotating at 50 rpm in the polymer melt was monitored, with increased torque indicative of an increase in the viscosity of the polymer melt. Torque measurements are set forth below in TABLE VII with increasing residence time at 385° C., expressed in meter-grams ("m-g"), for each of the compositions of Examples 1 and 3 and Comparative Examples C1–C4.

TABLE VII

| Residence Time (min) | Ex# 1 Torque (m-g) | Ex# 3 Torque (m-g) | CEx# C1 Torque (m-g) | CEx# C2 Torque (m-g) | CEx# C3 Torque (m-g) | CEx# C4 Torque (m-g) |
|---|---|---|---|---|---|---|
| 0 | 500 | 500 | 500 | 500 | 500 | 500 |
| 10 | 450 | 450 | 450 | 450 | 450 | 450 |
| 20 | 450 | 450 | 550 | 450 | 450 | 450 |
| 30 | 500 | 500 | 750 | 550 | 550 | 550 |
| 40 | 550 | 550 | 950 | 700 | 700 | 700 |
| 50 | 600 | 60 | 1200 | 800 | 750 | 1000 |
| 60 | 700 | 750 | 1500 | 1000 | 950 | 1400 |
| 70 | 750 | 90 | 1900 | 1250 | 1100 | 1700 |
| 80 | 900 | 1000 | 1900 | 1500 | 1250 | 1700 |
| 90 | 950 | 1100 | 2000 | 1500 | 1300 | 1700 |
| 100 | 1000 | 1200 | 2050 | 1500 | 1450 | 1500 |

The compositions of Examples 1 and 3 exhibited improved melt stability relative to the compositions of Comparative Examples C1–C4, as ated by the less pronounced increase in torque with increasing residence at 385° C. exhibited during testing of the compositions of Examples 1 and 3.

Molten samples of the compositions of Examples 4–7 and Comparative ple C5 were maintained at 380° C. in a rotary viscometer (Haake System The torque required to maintain the rotor of the viscometer rotating at 50 was monitored, with increased torque indicative of an increase in sample viscosity. Torque measurements are set forth below in TABLE VIII with asing residence time at 380° C., expressed in meter-grams ("m-g"), for of the compositions of Example 4-7 and Comparative Example C5.

TABLE VIII

| Residence Time (min) | CEX# C5 Torque (m-g) | Ex# 4 Torque (m-g) | Ex 5 Torque (m-g) | Ex# 6 Torque (m-g) | Ex# 7 Torque (m-g) |
|---|---|---|---|---|---|
| 5 | 295 | 189 | 308 | 350 | 364 |
| 10 | 357 | 194 | 293 | 365 | 394 |
| 20 | 444 | 220 | 319 | 370 | 425 |
| 30 | 481 | 230 | 334 | 396 | 451 |
| 40 | 491 | 240 | 350 | 437 | 482 |
| 50 | 532 | 266 | 391 | 468 | 507 |
| 60 | 574 | 276 | 427 | 509 | 523 |
| 70 | 620 | 307 | 437 | 560 | 574 |
| 80 | 662 | 338 | 483 | 617 | 620 |
| 90 | 708 | 363 | 540 | 663 | 656 |
| 100 | 796 | 404 | 596 | 745 | 748 |
| 110 | 910 | 491 | 653 | 807 | 784 |
| 120 | 987 | 593 | 766 | 874 | 866 |

The composition of Example 4–7 each exhibited improved stability relative to the composition of Comparative Example C5, as indicated by the less pronounced increase in torque with increasing residence time at 380° C.

Test specimens of the compositions of Comparative Example C1 and Example 2 were molded and subjected to the following testing: tensile strength at yield, tensile strength at break, tensile elongation and tensile modulous were measured according to ASTM 638 using 0.125 inch thick test specimens; flexural modulus and flexural strength were measured according to ASTM D790 using a 6 inch×0.5 inch×0.25 inch test specimens, reverse mpact strength was measured at 73° F. according to ASTM D256 using 2.5 inch×0.5 inch×0.125 inch test specimens; and dart impact strength according to ASTM D3763 at 73° F. using 4 inch diameter×0.125 inch thick test specimens.

Results of the testing are set forth below for Comparative Example C1 and Example 2 in TABLE IX as follows: tensile strength at yield, tensile strength at break and tensile modulus, each expressed in kilo-pounds per square inch ("kpsi"), tensile elongation expressed as a percentage of original specimen length ("%"), flexural strength and flexural modulus, each expressed in kpsi, reverse notched Izod impact, each expressed in foot-pounds per inch ("ft-lb/in") and dart impact, expressed in foot-pounds ("ft-lb").

TABLE IX

| | CEx# C1 | Ex# 2 |
|---|---|---|
| Tensile strength at yield (kpsi) | 14.3 | 14.5 |
| Tensile strength at break (kpsi) | 12.8 | 14.9 |
| Tensile Elongation (%) | 41 | 72 |
| Tensile Modulus (kpsi) | 444 | 451 |
| Flexural Strength (kpsi) | 20.4 | 21.5 |
| Flexural Modulus (kpsi) | 444 | 510 |
| Reverse Notched Izod Impact Strength (kpsi) | 38 | 40 |
| RT Dart Impact (ft-lb/ % ductile fracture) | 29/20 | 51/80 |

The composition of Example 2 exhibited improved tensile modulus flexural modulus and room temperature dart impact strength and ductility compared to the composition of Comparative Example C1.

The composition of the present invention exhibits improved melt stability and improved resistance to thermal degradation.

We claim:

1. A thermoplastic resin composition, comprising:

(a) a polyetherimide resin, and (b) a phosphorus-containing stabilizer, in an amount that is effective to increase the melt stability of the polyetherimide resin, wherein the phosphorus-containing stabilizer exhibits a low volatility such that, as measured by thermogravimetric analysis of an initial amount of a sample of the phosphorus-containing stabilizer, greater than or equal to 10 percent by weight of the initial amount of the sample remains unevaporated upon heating of the sample from room temperature to 300° C. at a heating rate of a 20° C. per minute under an inert atmosphere, wherein the phosphorus-containing compound is a compound according to the structural formula:

$$P\!-\!R_a$$

wherein each R' is independently H, alkyl, alkoxyl, aryl, arvloxy or oxo, andais3or4.

2. The composition of claim 1, wherein the composition comprises from 0.01 to 0.5 parts by weight of the phosphorus-containing stabilizer per 100 parts by weight of the polyetherimide resin.

3. The composition of claim 1, wherein the polyetherimide resin comprises structural units of the formula (I):

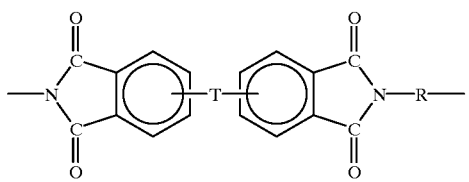

(I)

wherein the divalent T moiety bridges the 3,3', 3,4', 4,3', or 4,4' positions of the aryl rings of the respective aryl imide moieties of formula (I); T is —O— or a group of the formula —O—Z—O—; Z is a divalent radical selected from the group consisting of formulae (II):

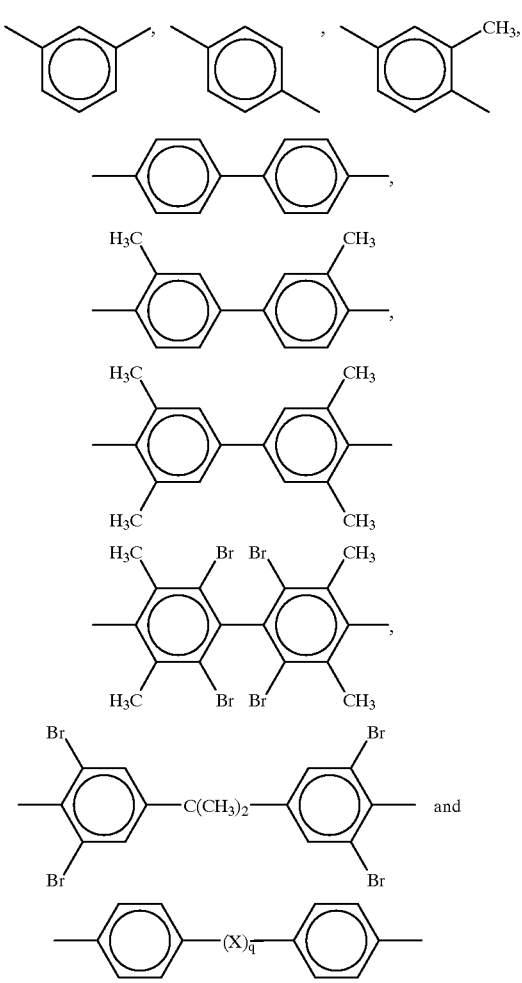

wherein X is a member selected from the group consisting of divalent radicals of the formulae (III):

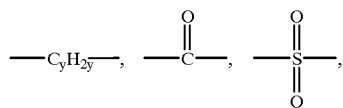

(III)

—O— and —S— wherein y is an integer from 1 to about 5, and q is 0 or 1; R is a divalent organic radical selected from the group consisting of: (a) aromatic hydrocarbon radicals having from 6 to about 20 carbon atoms and halogenated derivatives thereof, (b) alkylene radicals having from 2 to about 20 carbon atoms, (c) cycloalkylene radicals having from 3 to about 20 carbon atoms, and (d) divalent radicals of the general formula (IV):

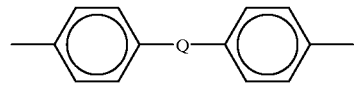

(IV)

where Q is a member selected from the group consisting of formulae (V):

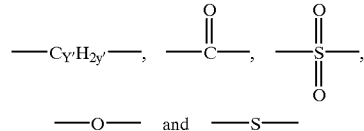

(V)

—O— and —S— where y' is an integer from about 1 to about 5.

4. The composition of claim 1, wherein the polyetherimide resin is the reaction product former by melt polymerization of 2,2-bis[4-(3,4-dicarboxyphenoxy)phenyl]propane dianhydride with at least one of paraphenylene diamine and metaphenylene diamine.

5. The composition of claim 1, wherein the phosphorus-containing stabilizer is selected from the group consisting of the reaction product of phosphorus trichloride with 1,1-biphenyl and 2,4-t-butylphenol, 2-[[2,4,8,10 tetrakis(1,1-dimethylethyl) dibenzo [d,f][1,2,3]dioxaphosphenin-6-yl]oxy]-N,N-bis[2-[[2,4,8,10-tetrakis(1,1-dimethylethyl) dibenzo [d,f][1,2,3] dioxphosphepin-6-yl]oxy]-ethyl] ethanamine, sodium phenyl phosphonate and 2,4-di-tert-butylphenol phosphite and mixtures thereof.

6. The composition of claim 1, further comprising an effective amount of a phenolic stabilizer.

7. The composition of claim 6, wherein the phenolic stabilizer is selected from the group consisting of N,N'-16-hexanedyl bis[3,5-bis(1,1-dimethylethyl)4-hydroxybenzenepropanamidel, the butylated reaction product of p-cresol and dicylopentadiene, terakis(methylene(3,5-di-t-butyl-4-hydroxyhydrocinnamate) and mixtures thereof).

8. The composition of claim 1, further comprising a mold release agent.

9. The composition of claim 8, wherein the mold release agent comprises p-tallow toluenesulfonamide.

10. A shaped article made by molding the composition of claim 1.

11. A thermoplastic resin composition, comprising the result of blending:
   (a) a polyetherimide resin, and (b) a phosphorus-containing stabilizer, in an amount that is effective to increase the melt stability of the polyetherimide resin, wherein the phosphorus-containing stabilizer exhibits a low volatility such that, as measured by thermogravimetric analysis of an initial amount of a sample of the phosphorus-containing stabilizer, greater than or equal to 10 percent by weight of the initial amount of the sample remains unevaporated upon heating of the sample from room temperature to 300° C. at a heating rate of a 20° C. per minute under an inert atmosphere, wherein the phosphorus-containing compound is a compound according to the structural formula:

$P\!-\!R_a$ wherein each R' is independently H, alky, alkoxyl, aryl, aryloxy or oxo, and a is 3 or 4.

12. A thermoplastic resin composition consisting essentially of:
   (a) a polyetherimide resin, and
   (b) a phosphorus-containing stabilizer, in an amount that is effective to increase the melt stability of the polyetherimide resin, wherein the phosphorus-containing stabilizer exhibits a low volatility such that, as measured by thermogravimetric analysis of an initial amount of a sample of the phosphorus-containing stabilizer, greater than or equal to 10 percent by weight of the initial amount of the sample remains unevaporated upon heating of the sample from room temperature to 300° C. at a heating rate of a 20° C. per minute under an inert atmosphere, wherein the phosphorus-containing compound is a compound according to the structural formula:

$P\!-\!R'_a$ wherein each R' is independently H, alkyl, alkoxyl, aryl, aryloxy or oxo, and a is 3 or 4.

* * * * *